United States Patent [19]

Bloom et al.

[11] 4,220,928
[45] Sep. 2, 1980

[54] ADAPTIVE CORRECTION OF LINEAR PHASE ABERRATIONS IN LASER AMPLIFIER SYSTEMS

[75] Inventors: David M. Bloom, Holmdel; Paul F. Liao, Fair Haven, both of N.J.

[73] Assignee: Bell Telephone Laboratories, Incorporated, Murray Hill, N.J.

[21] Appl. No.: 908,773

[22] Filed: May 23, 1978

[51] Int. Cl.$^2$ .......................... H01S 3/10; H01S 3/30
[52] U.S. Cl. .................... 330/4.3; 332/7.51; 350/3.81; 331/94.5 C
[58] Field of Search .................. 332/7.51; 330/4.3; 350/3.5; 331/94.5 C

[56] References Cited

U.S. PATENT DOCUMENTS 4,145,671  3/1979  Hellwarth ........................ 332/7.51

OTHER PUBLICATIONS

Jensen et al., "Observation of the Time-Reversed . . . Wave", 2/78, pp. 166–168, Appl. Phys. Lett., vol. 32, #3.
Hellwarth, "Generation of Time Reversed . . . Refraction", 1/77, pp. 1–3, J. Opt. Soc. Am., vol. 67, #1.
Yariv et al., "Amplified Reflection . . . Mixing", 7/77, pp. 16–18, OpticsLetters, vol. 1, #1, GZ54.
"Generation of Time Reversed . . . Waves", p. 26, Hellwarth et al., 5/78, Laser Focus.

Bloom et al., "Observation of Amplified . . . Vapor", 3/78, pp. 58–60, Optics Letters, vol. 2, #3.
Bloom et al., "Conjugate Wave Front . . . Mixing", 11/77, pp. 592–594, Appl. Phys. Lett., vol. 31, #9.
Hill, "Simple Transient Holograms in Ruby", 7/71, pp. 1695–1697, Applied Optics, vol. 10, #7, G–254.
Abrams et al., "Degenerate Four-Wave . . . Media", 4/78, pp. 94–96, Optics Letters, vol. 2, #4.

*Primary Examiner*—Nelson Moskowitz
*Attorney, Agent, or Firm*—Daniel D. Dubosky

[57] ABSTRACT

Linear phase aberrations in laser amplifier systems are adaptively corrected by a device which propagates an object beam formed by reflection of a laser beam from a target backwards through a laser amplifier chain in order to sample the linear phase aberrations and produces a conjugate image beam by degenerate four-wave mixing in a medium having a third order nonlinearity in susceptibility. The conjugate image beam which is amplified as it propagates back through the laser amplifier chain has the linear phase aberrations removed. The device also corrects for birefringent aberrations contained in the laser amplifier chain when (1) the medium has an isotropic nonlinearity; (2) the polarization of the pump beams, required for four-wave mixing, lies in the plane formed by the object beam and the pump beams; and (3) the angle between the object beams and the pump beams is substantially 90 degrees. The degenerate four-wave mixing is accomplished in one embodiment by gain saturation in Nd:YAG.

10 Claims, 4 Drawing Figures

ADAPTIVE CORRECTION OF LINEAR PHASE ABERRATIONS IN LASER AMPLIFIER SYSTEMS

BACKGROUND OF THE INVENTION

This invention pertains to the field of adaptive correction of linear phase aberrations and birefringent aberrations.

A vast effort is being expended to bring laser fusion to fruition. A significant portion of this effort is directed towards proper focusing of laser pulses from many amplifier chains onto a target pellet. These focusing effort require good lenses and extensive feedback devices in order to remove linear phase aberrations that have been added to the pulses by beam shaping elements as they have traversed the amplifier chain and by focusing elements which focus the resultant beam on the target pellet.

SUMMARY OF THE INVENTION

In accordance with the present invention a device is provided which adaptively corrects linear phase aberrations in laser amplifier systems. The apparatus operates by propagating a reflection of a laser beam from the target object backwards through the laser amplifier chain in order to "sample" the linear phase aberrations of the amplifier chain. A conjugate image beam is formed by degenerate four-wave mixing in a medium having a third order nonlinearity in susceptibility. The conjugate image beam is produced by the interaction of two conjugate pump beams and the object ("sampler") beam which has sampled the linear phase aberrations in the amplifier chain. The conjugate image beam which propagates back through the amplifier chain is amplified and has the linear phase aberrations removed as it impinges upon the target.

The aberrations which have been removed are due to the elements of the amplifier chain which are present to either help shape the beam or to spread it out before it enters specific amplifier elements. Any spatial filters present to help correct for nonlinearities in the amplifier elements which are intensity dependent must not be so restricted as to allow only a beam in a single mode to be propagated.

One feature of this invention is that it is not necessary for the pump beam, required for the degenerate four-wave mixing process, to be planar. Instead, it is only necessary that the product of the electric fields of the pump beams have a phase which is spatially independent. This is satisfied for a pair of pump beams which are the conjugate of each other. The eigenmodes of a Fabry-Perot resonator are conjugate waves. Even for multi-transverse mode operation of the resonator, the product of the amplitude of the forward and backward waves is always real and positive. Thus, wavefront conjugation can be achieved in a laser cavity even with multi-transverse mode operation.

Another feature of this invention is that a single laser may be used to provide the source of the "sampler" beam and the pump beams.

Yet another feature of this invention is that the third order nonlinearity may be generated by saturable gain in the nonlinear medium.

Yet another feature of this invention is that a single laser gain material, such as Nd:YAG may be placed in a laser cavity and provide the source of the "sampler" beam, the pump beams and the nonlinear medium itself.

Yet another feature of this invention is that a medium with a slowly decaying nonlinearity may be used so that the "sampler" wave may pass backwards through the amplifier chain before the chain is energized to write a grating in the nonlinear medium. Then, the grating may be read out by one or both of the pump beams to form the conjugate beam. The conjugate beam will then repass through the amplifier chain when it has been energized. This will help prevent damage which might result if both the "sampler" and conjugate beam were amplified.

Yet another feature of this invention is that birefringent aberrations are corrected if (1) the medium has an isotropic nonlinearity; (2) the polarization of the pump beams lie in the plane formed by the pump beams and the object beam, (3) and the object beam and pump beams are orthogonal.

BRIEF DESCRIPTION OF THE DRAWING

A complete understanding of the present invention and of the above and other features thereof may be gained from a consideration of the following detailed description presented hereinbelow in connection with the accompanying diagram in which.

DETAILED DESCRIPTION

Figure 1:
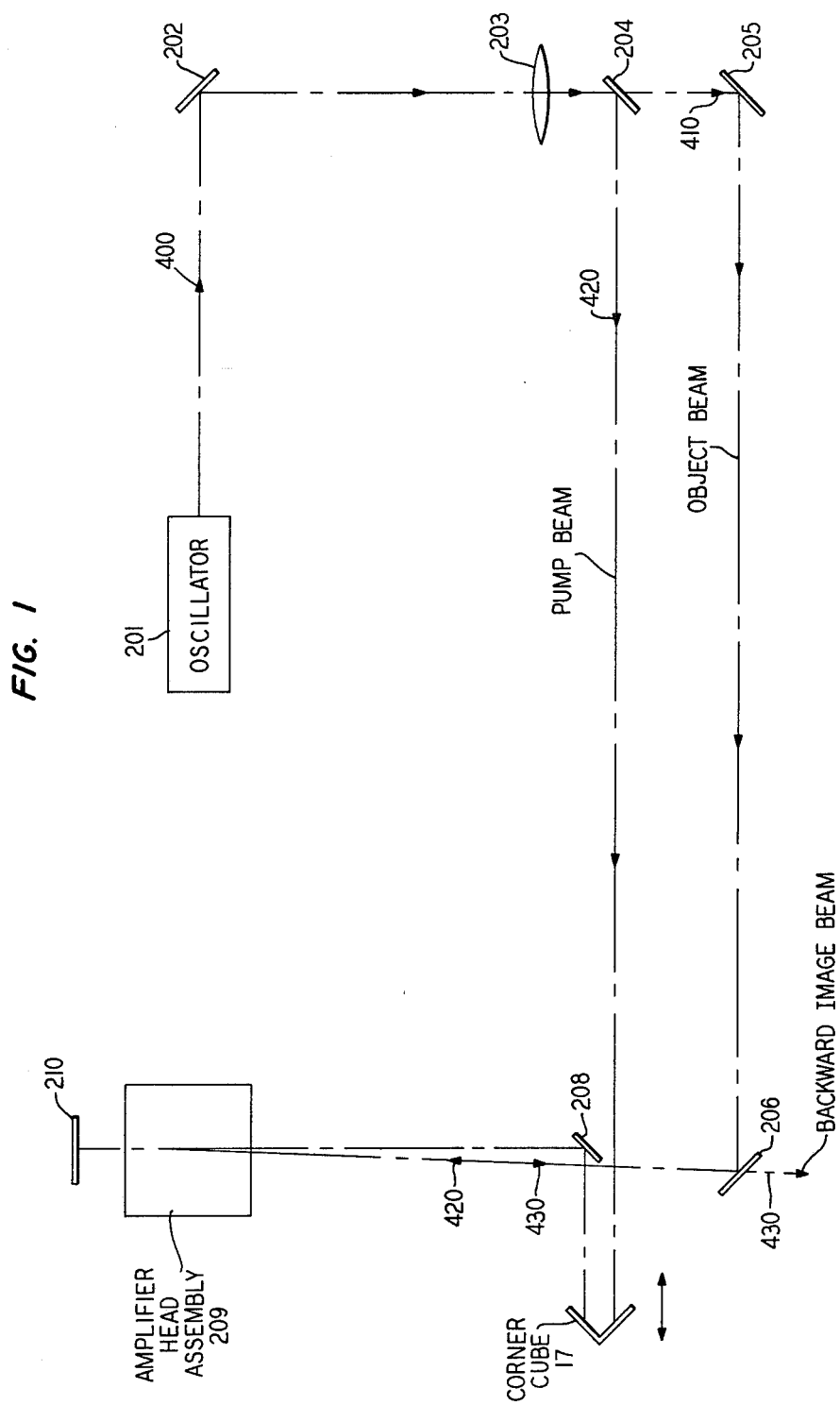
FIG. 1 shows in partially pictorial, partially schematic form, an apparatus in which a degenerate four-wave mixing process uses a third order nonlinearity produced by gain saturation in Nd:YAG.

The degenerate four-wave mixing process in media having a third order nonlinearity in susceptibility can be used to directly generate phase conjugated beams. This four-wave process utilizes two counterpropagating pump waves to interact with each plane wave component of an object beam to produce a phase conjugated beam which propagates counter directionally to the incident object beam. This result has been demonstrated in, among others, the following media: (1) transparent materials exhibiting Kerr nonlinearities, such as $CS_2$; (2) atomic metallic vapors, such as sodium; and (3) solids, such as a ruby.

The four-wave mixing process can be viewed as the nearly instantaneous production and reading out of a thick hologram. In one aspect of the present invention the thick hologram is generated by the process of saturating the gain of a medium. In particular, a reduction to practice of the four-wave mixing process using gain saturation was performed by using a pumped piece of Nd:YAG. A Nd:YAG rod is pumped by cw or flashlamp to establish a gain and this gain is used to produce the nonlinearity by saturating the gain induced. If the medium is characterized in terms of a four-level system, the efficiency of the thick grating formed by saturating the gain may be derived from simple rate equations and is given approximately by:

$$eff \approx \left[ gL \frac{J_{pump/A}}{J_{sat/A}} \right]^2 \quad (1)$$

if the pulse length of the pump wave is shorter than the lifetime of the upper level (where g is the small signal gain of the material; L is the interaction length; $J_{sat/A} = \hbar\omega/\delta$, $\hbar$ is Planck constant divided by $2\pi$, $\omega$ is the frequency of the radiation, and $\delta$ is the gain crossection; and $J_{pump/A}$ is the energy per unit area of the pulsewave).

If the pulse length of the pump wave is longer than the upper state lifetime $$eff \approx \left[ gL \frac{P_{pump/A}}{P_{sat/A}} \right]^2 \quad (2)$$

where $P_{sat/A} = \hbar\omega/\delta\tau_{relax}$ and $\tau_{relax}$ is the upper state lifetime. This method of providing the nonlinearity by gain saturation is a general technique but is most advantageously applied to materials which have a large gain g so that the efficiency in equations (1) or (2) is large.

The fact that one may achieve wavefront conjugation by gain or loss saturation in the presence of standing wave pumps is not obvious. One would normally expect the efficiency of the process to decrease as the medium becomes highly saturated.

When wavefront conjugation is performed internal to a laser cavity or with equal intensity pump waves, the standing wave produced can "burn holes" in the nonlinearity which will reduce the strength of the nonlinear interaction in these regions. However the nonlinearity will be unsaturated in the minima of the standing wave, and therefore conjugate wave generation can be produced.

For times long compared to the upper state lifetime of the gain medium the saturated nonlinearity can be expressed in terms of the following proportionality:

$$\chi \propto 1/(1+I/I_{sat}) \quad (3)$$

where $I_{sat}$ is the saturation intensity and the intensity I of the standing wave can be written as $$I = I_o \cos^2\theta = I_o(1+\cos 2\theta)/2 \quad (4)$$

using equations (3) and (4) gives:

$$\chi \propto 1/(1+I_o/(2I_{sat}) + I_o \cos 2\theta/(2I_{sat})) \quad (5)$$

The effective susceptibility of the medium is the average value of $\chi^{(3)}$ $$\bar{\chi} \propto \int_0^{\pi/2} d\theta/(1 + I_o/(2I_{sat}) + I_o \cos 2\theta/(2I_{sat})) \quad (6)$$

$$\bar{\chi} \propto 1/\sqrt{1+I_o/I_{sat}} \quad (7)$$

The overall efficiency of the medium is proportional to $(\bar{\chi})^2 I_o^2$ which gives $$eff \propto I_o^2/(1+I_o/I_{sat}) \quad (8)$$

Now we examine equation (8) first in the region where $I_o << I_{sat}$ and find that eff $\propto I_o^2$. Next in the region where $I_o >> I_{sat}$ we find that eff $\propto I_o I_{sat}$. This gives the important result that the efficiency of the material in producing the conjugate image beam continues to increase even though the material is highly saturated.

The use of gain saturation to produce a nonlinearity was reduced to practice in Nd:YAG in the configuration shown in FIG. 1. Laser source 201, a Quanta Ray YAG oscillator, was used to generate beam 400. The amplifier head assembly 209 was removed from a Quanta Ray laser so as to be used as the gain medium in which gain saturation was to be demonstrated. The output beam 400 from laser source 201 was not very well collimated, so a 5 m focal length lens 203 was used to improve the collimation of beam 400 after it was reflected from reflector 202. Beamsplitter 204 was used to split beam 400 into beam 420 which was used as a source for the pump beams and beam 410 which was used as the object beam. The pathlength of beam 420 was adjusted by placing corner cube 17 on an optical rail so that beam 420 and beam 410 travelled in equal distance before entering amplifier head 209. Beam 420 was targeted onto amplifier head 209 by reflector 208. Reflector 210 was arranged to be normal to the direction of incidence of beam 420 to provide the counterpropagating pump beams needed for the four-wave mixing process.

Beam 410 was directed to amplifier head 209 by reflection from reflector 205 and beamsplitter 206. Beamsplitter 206 was used to couple out backward beam 430 created by the four-wave mixing process operating through the gain saturation in the Nd:YAG.

To verify that a conjugate wave front was being generated, a diverging lens was placed in beam 410 before beamsplitter 206. The backward generated wave came to a focus corresponding to the virtual focus of the lens.

It is important to note that it is not necessary for the counterpropagating pump beams in the degenerate four-wave mixing process to be planar; instead, it is only necessary that the product $E_{p1}(x,y,z) \times E_{p2}(x,y,z)$, where $E_{p1}$ and $E_{p2}$ are the amplitudes of the pump beams, has a phase which is spatially independent. This is satisfied for a pair of pump beams which are the conjugate of each other. This is an important result which greatly expands the application of the present invention.

The eigenmodes of a Fabry-Perot resonator are conjugate waves in that the forward and backward traveling waves are conjugate pairs. In fact, even for multitransverse mode operation, the product of the amplitude of the forward and backward waves is always real and positive. This means that wavefront conjugation can be achieved in a laser cavity even with multi-transverse mode operation.

Figure 2:
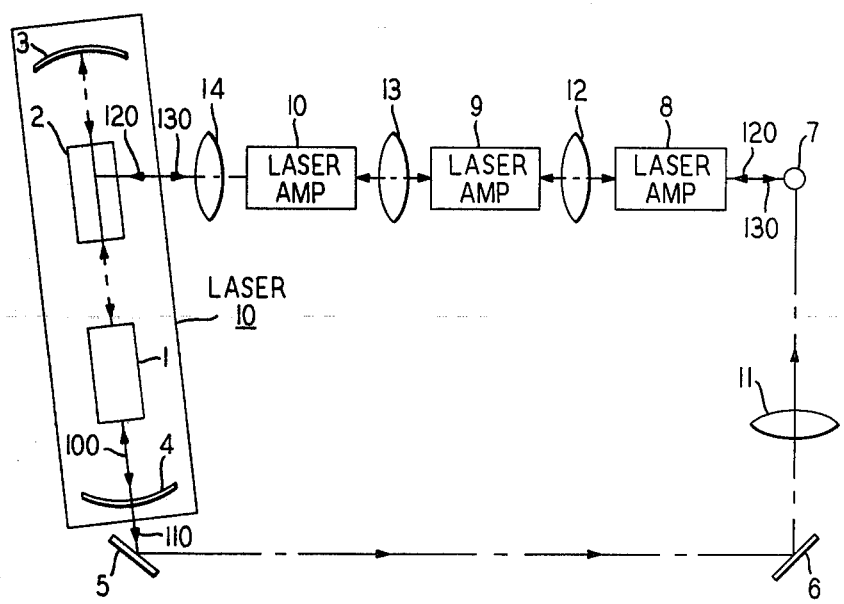
FIG. 2 shows in partially pictorial, partially schematic form, an embodiment of the present invention wherein the material having the third order nonlinearity is placed in a laser cavity.

FIG. 2 shows a device for adaptively correcting for linear phase aberrations as applied to a laser fusion amplifier chain according to the present invention. Laser medium 1 of laser 10 is placed in a laser cavity consisting of reflectors 3 and 4. Beam 100, produced in laser 10, provides a source for the pump beams required in the four-wave mixing process. Mirror 4 is partially transmitting to allow energy to be coupled out of laser cavity 10 to form beam 110. Beam 110 is reflected from mirrors 5 and 6 and focused by lens 11 onto a target object 7. "Sampler" beam 120 is formed by reflection of the focused beam 110 off target 7. Beam 120 passes through the amplifier chain made up of amplifier elements 8, 9, 10 and lens elements 12, 13 and 14. Beam 120 then impinges upon nonlinear medium 2 which has been placed in laser cavity 10. Conjugate image beam 130 is produced when conjugate pump beams, formed in cavity 10 from beam 100, and "sampler" beam 120 overlap in nonlinear medium 2. Beam 130 propagates in the opposite direction from beam 120 and passes back through the amplifier chain made up of amplifiers 8, 9, 10 and lens elements 12, 13, 14. As beam 130 passes through the amplifier chain, the linear phase aberrations which were introduced into beam 120 are removed.

In one application, nonlinear medium 2 can have a long relaxation time. This would allow beam 120 to pass through the amplifier chain before the gain has been excited in amplifiers 8, 9 or 10 to form a grating in nonlinear medium 2. Then, the amplifiers in the chain may be energized and a second round of pulses in the cavity of laser 10 can read-out the grating to form beam 130. This procedure will only amplify beam 130 as it passes through the amplifier chain and mitigate possible damage due to the amplification of beam 120 as well as beam 130. It is well known in the art how to synchronize these events in time. In the particular embodiment shown in FIG. 2, nonlinear medium 2 may have gain induced in it via a mechanism in laser 10 such as a flashlamp discharge (not shown). It if is desired that beam 110 have a good, i.e. diffraction limited, wavefront as it impinges upon target 7, a spatial filter may be inserted between reflectors 5 and 6 in FIG. 2. The method of extracting beam 110 from laser cavity 10 by partially transmitting mirror 4 is merely illustrative and any of the well known techniques for "cavity dumping" may be used as well. It is also important to note that the phasematching conditions of degenerate four-wave mixing put no restrictions on the angle between beam 100 in laser cavity 10 and "sampler" beam 120.

A further aspect of the present invention is that it may be used to remove arbitrary birefringent aberrations in the laser amplifier chain. The key to the operation of the device for this aspect lies in using a pump beam polarization such that any polarization component of the "sampler" object beam experiences the same nonlinearity. This is achieved in an isotropic medium by requiring the polarization of the conjugate pump beams to lie in the plane of the pump beams and the "sampler" object beams and further requiring that the angle between the pump beams and the "sampler" object beam be 90 degrees. This configuration causes any polarization of the "sampler" object beam to be orthogonal to the pump beam polarization. Thus when the nonlinear medium is isotropic, ($\chi_{1122} = \chi_{2233} = \chi_{1133} = \chi_{3311} = \chi_{3322} = \chi_{2211}$) such as in $CS_2$, the nonlinear interaction will be of the same magnitude for each component of polarization of the "sampler" object wave. The conjugate image wave formed by the degenerate four-wave mixing will have its original polarization restored as it passes back through the spatially inhomogeneous birefringent medium that "scrambles" the polarization.

The effects of this further aspect of the present invention may be achieved in the embodiment shown in FIG. 2 by making the angle between beam 100 and beam 120 equal to 90 degrees, using an isotropic nonlinear medium such as $CS_2$ for nonlinear medium 2, and polarizing beam 100 by any of the methods known in the art such as insertion of a polarizer in the cavity of laser 10.

This birefringent aberration correction may also be obtained in an isotropic medium when the polarization of the conjugate pump beams lie in the plane of the pump beams and the "sampler" object beams where the angle between the pump beams and the "sampler" object beam is not 90 degrees. In this configuration the components of polarization of the "sampler" object beam which are perpendicular and parallel to the direction of polarization of the conjugate pump beams may not have the same magnitude of nonlinear interaction. However, if the conjugate image beam produced then passes through a further medium which adds loss selectively to the different components of the polarization such as a dichroic material, enough loss would be added to the polarization component with the higher gain so as to equalize the gain for both polarization components. The resultant conjugate image beam would then remove the birefringent aberrations as it passed back through the spatially inhomogeneous birefringent medium.

Figure 3:
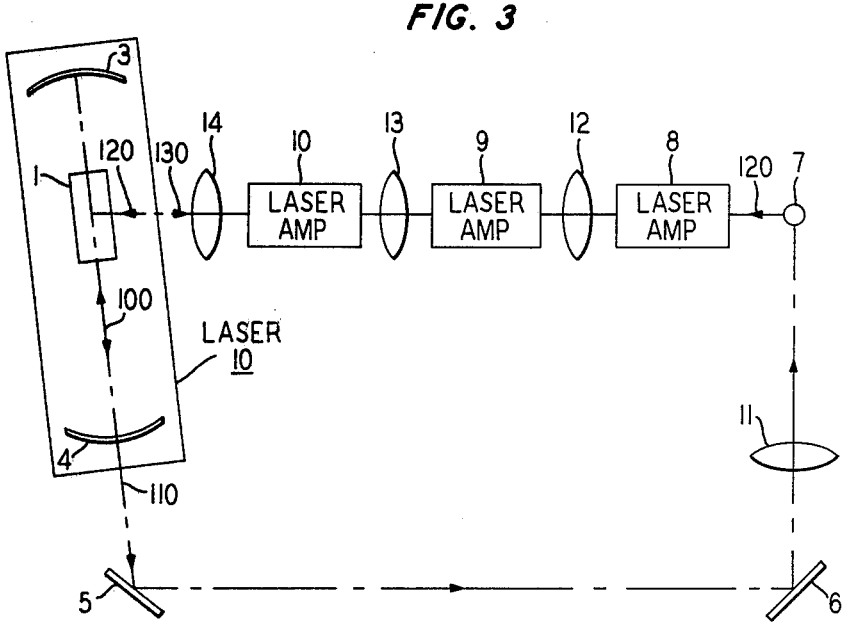
FIG. 3 shows in partially pictorial, partially schematic form, an embodiment of the present invention wherein the laser material producing the conjugate pump beams also provides the third order nonlinearity by gain saturation.

FIG. 3 shows another embodiment for adaptively correcting for linear phase aberrations as applied to a laser fusion amplifier chain according to the present invention. Laser medium 1 is placed in the cavity of laser 10 made up of reflectors 3 and 4. Reflector 4 is partially transmitting and allows part of the pulse from beam 100 produced in the cavity of laser 10 to leak out of the cavity to form beam 110. Beam 110 is directed to target 7 by reflectors 5 and 6. Beam 110 is focused on target 7 by lens 11. "Sampler" beam 120 is formed by the reflection of beam 110 from target 7. Beam 120 passes backward through the amplifier chain consisting of amplifiers 8, 9, 10 and lenses 12, 13 and 14. Beam 120 then impinges upon laser medium 1 in which the degenerate four-wave mixing process takes place to form conjugate image beam 130. We again note that the phasematching conditions of degenerate four-wave mixing put no restrictions in the angle between beam 100 in the cavity of laser 10 and "sampler" beam 120. Conjugate image beam 130 then passes back through the amplifier chain and removes the linear phase aberration introduced by the elements of the chain. The four-wave nonlinear process in this particular embodiment has been advantageously achieved by gain saturation in laser medium 1. The same results apply to this embodiment as were discussed hereinabove for the embodiment shown in FIG. 2 with respect to synchronization of pulses, "cavity dumping", and the use of spatial filters.

Figure 4:
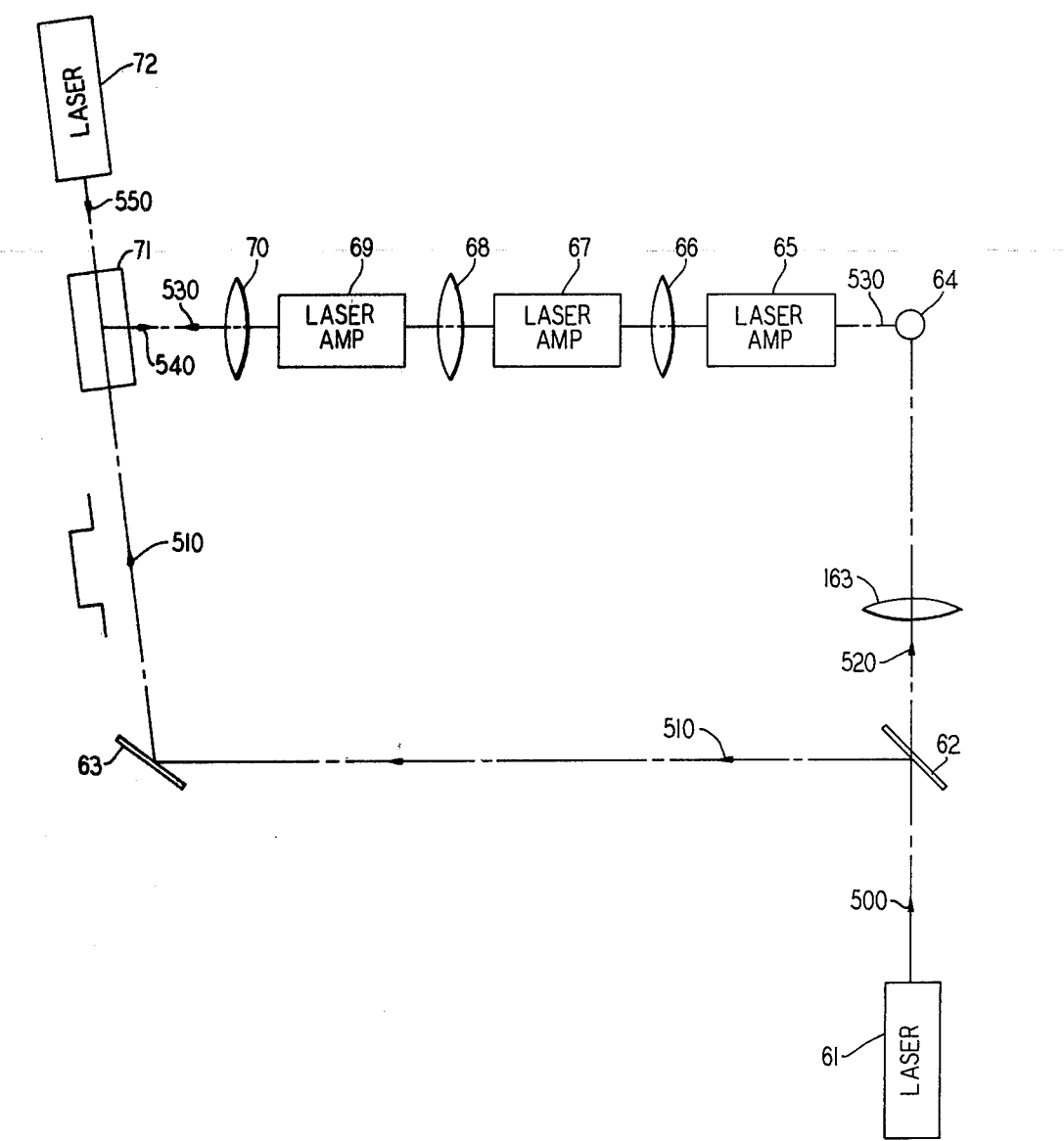
FIG. 4 shows in partially pictorial, partially schematic form, an embodiment of the present invention wherein the conjugate pump beams are produced by separate laser sources.

In another embodiment of this invention shown in FIG. 4 degenerate four-wave mixing is achieved by using different lasers for generating each of the two pump beams. Laser source 61 produces beam 500 which is split by beamsplitter 62 into beam 510 and beam 520. Beam 510 directed by reflector 63 so as to be used as one of the conjugate pump beams needed for degenerate four-wave mixing. Beam 520 is focused by lens 163 to impinge on target 64. "Sampler" beam 530 is formed by reflection of beam 520 from target 64. Beam 530 in turn passes backward through amplifier chain consisting of amplifiers 65, 67 and 69, and lenses 66, 68 and 70. Beam 530 and beam 510 "record" a hologram as they impinge on nonlinear medium 71. The phasematching conditions of degenerate four-wave mixing put no restrictions on the angle between beam 510 and beam 530. Laser source 72 is delayed for less than or equal to the lifetime of the excited state of nonlinear medium 71, assuming that we are creating the third order nonlinearity by the gain saturation mechanism, by techniques well known in the art. Laser source 72 then produces beam 550 which "reads-out" the thick hologram produced by beams 510 and 530. The "read-out" mechanism forms conjugate image pulse 540 which propagates back through the amplifier chain with the same effect as has been previously discussed hereinabove. This embodiment provides another arrangement which allows the "sampler" beam 530 to pass through the amplifier chain to sample the linear phase aberrations before the amplifiers have been energized. Beam 500 which is produced by laser 61 can have a long pulse width and beam 510 which is produced by laser 72 could be a modelocked pulse to provide a narrow output conjugate image pulse. As noted before the synchronism between laser source 71, laser source 72 and amplifiers 65, 67 and 69 may be provided by techniques well known in the art.

What is claimed is:

1. In combination:

a medium having a third-order nonlinearity in susceptibility;

means for providing counterpropagating pump beams in said medium, said pump beams having substantially the same frequency;

means for irradiating said medium with an object beam having a frequency component substantially equal to the frequency of said pump beams, which object beam spatially and temporally overlaps said pump beams in said medium; and means, placed in the path of said object beam, for extracting a beam that is counterpropagating in the path of said object beam;

characterized in that said means for providing counterpropagating pump beams includes means for providing nonplanar counterpropagating pump beams such that the product of the amplitudes of said pump beams has a phase which is spatially independent.

2. The combination as defined in claim 1 wherein said means for providing counterpropagating pump beams includes a laser cavity.

3. Apparatus to focus an object beam, which passes through an optical system having an input end and an output end and further having linear phase aberrations, on a target object in such a manner that said linear phase aberrations of said optical system have been adaptively removed from said object beam when it impinges on said target object, said apparatus comprising:

a laser oscillator means having a cavity, a gain medium, and means for extracting a beam generated by said laser oscillator means;

means for directing said beam from said laser oscillator means toward said target object, thereby generating a reflected beam from said target object which enters said output end of said optical system and traverses said optical system to emerge at said input end as a sampler beam possessing the linear phase aberrations introduced into said reflected beam by said optical system;

a medium having a third order nonlinearity in susceptibility positioned within said cavity of said laser oscillator means such that radiation in said cavity establishes counterpropagating pump beams in said medium and said sampler beam spatially and temporally overlaps said counterpropagating pump beams in said medium, whereby said object beam is created which counterpropagates in the path of said sampler beam so as to traverse said optical means and focus on said target object having had said linear phase aberrations of said optical system adaptively removed when it impinges on said target object.

4. Apparatus as defined in claim 3 wherein said optical system is a laser amplifier chain.

5. Apparatus as defined in claim 3 wherein said medium having a third order nonlinearity in susceptibility has an isotropic nonlinearity, and said apparatus further includes:

means placed in said laser oscillator means for polarizing said conjugate pump beams in the plane defined by said conjugate pump beams and said sampler beam, said laser oscillator means disposed such that said conjugate pump beams and said sample beam spatially overlap at substantially right angles in said medium, whereby said apparatus additionally corrects birefringent aberrations in said optical system.

6. Apparatus as defined in claim 5 wherein said medium having a third order nonlinearity in susceptibility is $CS_2$.

7. Apparatus as defined in claim 3 wherein said medium having a third-order nonlinearity in susceptibility has an isotropic nonlinearity, and said apparatus further includes:

means, placed in said laser oscillator means, for polarizing said conjugate pump beams in the plane defined by said conjugate pump beams and said sampler beam, said laser oscillator means disposed such that said conjugate pump beams and said sampler beam spatially overlap at angles other than right angles in said medium; and means for adding loss to the object beam to equalize the gain of the components of polarization which are perpendicular and parallel to the direction of polarization of the conjugate pump beams, whereby said apparatus additionally corrects birefringent aberrations in said optical system.

8. Apparatus to focus an object beam, which passes through an optical system having an input end and an output end and further having linear phase aberrations, on a target object in such a manner that said linear phase aberrations of said optical system have been adaptively removed from said object beam when it impinges on said target object, said apparatus comprising:

a laser oscillator means including a cavity, a gain medium in which gain saturation can be established, means for establishing gain in said gain medium, and means for extracting a beam generated by said laser oscillator means from said cavity, said gain medium being disposed in said cavity such that radiation in said cavity establishes counterpropagating pump beams in said gain medium;

means for directing said beam from said laser oscillator means toward said target object, thereby generating a reflected beam from said target object which enters said output end of said optical system and traverses said optical system to emerge at said input end as a sampler beam possessing the linear phase aberrations introduced into said reflected beam by said optical system, said sampler beam spatially and temporally overlapping said counterpropagating pump beams in said gain medium, whereby said object beam is created which counterpropagates in the path of said sampler beam so as to traverse said optical system and focus on said target object having had said linear phase aberrations of said optical system adaptively removed when it impinges on said target object.

9. Apparatus as defined in claim 8 wherein said optical system is a laser amplifier chain.

10. Apparatus to focus an object beam, which passes through an optical amplification system having an input end, an output end and further having linear phase aberrations, on a target object in such a manner that said linear phase aberrations of said optical amplification system have been adaptively removed from said object beam when it impinges on said target object, said apparatus comprising:

a first laser for generating a first beam of radiation having a first frequency;

means for generating a first pump beam and a target beam from said first beam of radiation;

means for directing said target beam toward said target object, thereby generating a reflected beam from said target object which enters said output end of said optical amplification system while said optical amplification system is deactivated, said reflected beam traverses said optical amplification system to emerge at said input end as a sampler beam possessing the linear phase aberrations introduced into said reflected beam by said optical system;

a medium having a third-order nonlinearity in susceptibility, said nonlinearity having a lifetime, said medium being positioned such that said first pump beam and said sampler beam spatially and temporally overlap in a region in said medium during an overlap time;

a second laser for generating a second beam of radiation having a frequency substantially equal to said first frequency, said second beam propagating in substantially the opposite direction from said first pump beam so as to spatially overlap said region in said medium; and means for activating said second laser and said optical amplification system at a predetermined time after said overlap time, the difference between said predetermined time and said overlap time being less than said lifetime, whereby said object beam is created which counterpropagates in the path of said sampler beam so as to traverse said optical amplification system while said optical amplification system is activated and is focused on said target object having had said linear phase aberrations of said optical amplification system adaptively removed when it impinges on said target object.

* * * * *